US008726263B2

(12) United States Patent
Rangarajan et al.

(10) Patent No.: US 8,726,263 B2
(45) Date of Patent: May 13, 2014

(54) DETECTION AND INSTALLATION OF SOFTWARE ON A PER-USER BASIS

(75) Inventors: Rajasekaran Rangarajan, Kirkland, WA (US); Christopher S. Gouge, Redmond, WA (US); Hrishikesh S. Raje, Seattle, WA (US); Mark H. Phaedrus, Lake Forest Park, WA (US); Leo Edwin Lie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 13/247,721

(22) Filed: Sep. 28, 2011

(65) Prior Publication Data

US 2013/0081008 A1    Mar. 28, 2013

(51) Int. Cl.
G06F 9/44    (2006.01)

(52) U.S. Cl.
USPC .......................................................... 717/168

(58) Field of Classification Search
CPC ........................................................ G06F 8/65
USPC .......................................................... 717/168
See application file for complete search history.

(56) References Cited

U.S. PATENT DOCUMENTS

| 7,478,381 | B2 | 1/2009 | Roberts et al. |
| 7,539,686 | B2 | 5/2009 | Shepard et al. |
| 7,555,551 | B1 | 6/2009 | McCorkendale et al. |
| 2002/0100036 | A1* | 7/2002 | Moshir et al. ................. 717/173 |
| 2008/0301672 | A1* | 12/2008 | Rao et al. ...................... 717/177 |
| 2009/0193409 | A1* | 7/2009 | Dave et al. .................... 717/173 |

OTHER PUBLICATIONS

Peter Kellner; "Is it possible to Emulate being logged in as another user?" ASP.net website discussion thread; Jan. 8, 2007.*
"Determining Installation Context"; Microsoft® MSDN® website as captured by the Wayback Machine Internet Archive (archive.org) on Jan. 29, 2011.*
"Patching Per-User Managed Applications"; Microsoft® MSDN® website as captured by the Wayback Machine Internet Archive (archive.org) on Dec. 9, 2010.*
Harder, Bobbie, "Managing the WSUS Automatic Updates Client Download, Install, and Reboot Behavior with Group Policy", Published on May 4, 2006, available at <<http://technet.microsoft.com/en-us/library/cc512630.aspx>>.
Mensching, Rob, "The ClickThrough Project", Published on Mar. 2005, available at: http://wix.sourceforge.net/ctvision.html.
"Omaha Overview", Retrieved on Sep. 5, 2011 at <<http://omaha.googlecode.com/svn/wiki/OmahaOverview.html>>.

(Continued)

*Primary Examiner* — Anna Deng
*Assistant Examiner* — Clint Thatcher
(74) *Attorney, Agent, or Firm* — Andrew Sanders; Micky Minhas; Lee & Hayes, PLLC (57) ABSTRACT

Techniques for detection and installation of software on a per-user basis are disclosed. An update agent in a client device may receive configuration data for a software application, the configuration data indicating availability of updates for the software application. The client device may be configured to have user accounts for a plurality of users. The update agent may determine that the software application is a per-user application. The update agent may identify a subset of the plurality of users for whom the updates for the software application are to be installed. The update agent may download the updates for the software application, and install the updates for a first user of the subset, in response to the first user logging into the client device.

20 Claims, 5 Drawing Sheets

(56) References Cited

OTHER PUBLICATIONS

"Password Manager Provisioning Software Development Kit (SDK)", retrieved on Sep. 5, 2011 at <<http://support.citrix.com/proddocs/topic/passwordmanager/pm-provisioning-sdk-library-wrapper.html>>.

Stewart, Bill, "Use Group Policy to distribute JRE with its Automatic Update Feature Disabled", Published on Dec. 4, 2008, available at: <<http://www.windowsitpro.com/article/java/use-group-policy-to-distribute-jre-with-its-automatic-update-feature-disabled>>.

* cited by examiner

FIG. 1

| PER-USER APPLICATION LIST | INSTALLED FOR USER(S) | UPDATES AVAILABLE FOR USER(S) |
|---|---|---|
| PER-USER APPLICATION 114A | USER A | USER A |
| PER-USER APPLICATION 114B | USERS B AND C | USERS B AND C |
| PER-USER APPLICATION 114C | USERS A, C AND M | USERS C AND M |
| PER-USER APPLICATION 114D | USER D | NONE |
| ⋮ | ⋮ | ⋮ |
| PER-USER APPLICATION 114N | USER M | USER M |

FIG. 2A

| USER LIST | PER-USER APPLICATION LIST FOR WHICH UPDATES ARE AVAILABLE |
|---|---|
| USER A | PER-USER APPLICATION 114A |
| USER B | PER-USER APPLICATION 114B |
| USER C | PER-USER APPLICATIONS 114B AND 114C |
| USER D | NONE |
| ⋮ | ⋮ |
| USER M | PER-USER APPLICATIONS 114C AND 114N |

DETECTION AND INSTALLATION OF SOFTWARE ON A PER-USER BASIS

BACKGROUND

Operating systems have long been supporting the notion of multiple users for a client device. A software application installed on the client device may be visible to each of the multiple users, and each of the multiple users may have the ability to run the software application. Such a software application is generally referred to as a machine-wide application.

Another software application may be visible to only a subset of the multiple users of the client device. That is, only the subset of the multiple users, for whom the other software application is installed, may be able to view and run the other software application. Such a software application is generally referred to as a per-user application.

An update mechanism of a software application may generally be configured to check for updates, download newly available updates in the client device, notify users of the client device about the newly available updates, and/or install the newly available updates. Automatic update mechanisms generally support machine-wide applications, but generally do not support per-user applications. For example, generally, in a conventional system, each user may be responsible for searching, downloading and installing updates for per-user applications that the user had installed.

SUMMARY

This summary introduces simplified concepts of detection and installation of software on a per-user basis, which is further described below in the Detailed Description. This summary is not intended to identify essential features of the claimed subject matter, nor is it intended for use in limiting the scope of the claimed subject matter.

This application describes example embodiments of detection and installation of software on a per-user basis. Generally, a client device as described herein employs an update agent, which provides a centralized way of managing updates for various per-user applications in the client device. The update agent may automatically update the various per-user applications, with a relatively low level of involvement from various users of the client device, for whom the various per-user applications are installed.

In an embodiment, the update agent may interface with various content sources. Each content source may be configured to provide updates for one or more corresponding per-user applications. In an embodiment, the update agent may receive configuration data for a per-user application from a content source. The configuration data may indicate availability of updates for the per-user application. The client device may have user accounts for a plurality of users.

The update agent may identify a subset of users from the plurality of users, where the updates for the per-user application are to be installed for the subset of users (e.g., as the per-user application may be installed for each user in the subset of users). The update agent may download the updates at any opportunistic time. The update agent may install the updates for a user of the subset of users, when the user of the subset of users is logged into the client device. In an embodiment, detection and downloading of updates for the subset of users may be performed regardless of whether individual users of the subset of users are logged into the client device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, existing technologies fail to manage updating various per-user applications in a cohesive manner. This disclosure describes a centralized system for detection and installation of software on a per-user basis, in which updates for various per-user applications are detected, downloaded and installed in an organized manner. An update agent in the client device may centrally update the various per-user applications, with a relatively low level of involvement (e.g., compared to a level of involvement in a conventional system) from various users of the client device.

Generally, a client device may have a large number of per-user applications installed. The client device may have user accounts for a plurality of users (i.e., each of the plurality of users may have an ability to log into the client device). Updates for various per-user applications may be available from one or more content sources. For example, a content source may be configured to provide updates for one or more corresponding per-user applications.

The update agent may communicate with the content sources, and receive configuration data from the content sources. The update agent may determine, from the configuration data received from a content source, whether updates are available from the content source for one or more per-user applications.

The update agent may also communicate with an installer module in the client device. In an embodiment, the installer module may be configured to install the per-user applications in the client device and install updates for the per-user applications (although in another embodiment, the update agent may communicate with more than one installer module, where each installer module may be configured to install and update one or more corresponding per-user applications). Subsequent to receiving the configuration data indicating availability of updates for one or more per-user applications, the update agent may communicate with the installer module to identify a subset of the users of the client device for whom the updates are applicable.

For example, the configuration data from a content source may indicate availability of updates for a first per-user application, a second per-user application, and a third per-user application. The update agent may communicate with the installer module to determine that the first per-user application is installed by users P and Q of the client device, the second per-user application is installed by user P of the client device, and the third per-user application is not installed by any of the users of the client device. Thus, updates for the first per-user application are applicable to users P and Q, updates for the second per-user application are applicable to user P, and updates for the third per-user application are not applicable to any of the users of the client device.

The update agent may download updates that are applicable to one or more users of the client device. For example, the update agent may download updates for the first and second per-user applications.

Once a user logs into the client device, the update agent may be notified (e.g., by a user notification module) that the user has logged in. In response to the user logging into the client device, the update agent may identify the updates that are applicable to the user and the installer module may install the updates. For example, when user P logs into the client device, the installer module may install updates for the first and second per-user applications. On the other hand, when user Q logs into the client device, the installer module may install updates for the second per-user application. In an embodiment, the update agent may install updates available for the currently logged-in user.

In an embodiment, while identifying and downloading updates for a user, the user need not be logged into the client device. For example, while the update agent identifies that updates for the first and second per-user applications are available and are applicable to user P, the user P need not be logged into the client device. Similarly, when the update agent downloads updates for the first and second per-user applications, the user P need not be logged into the client device. In an embodiment, updates for a user are installed when the user is logged into the client device. For example, updates for the first and second per-user applications for user P are installed when user P is logged into the client device.

This disclosure describes multiple and varied implementations and embodiments. The following section describes an example environment that is suitable for practicing various implementations. The next section describes example operations of the example environment, and example methods for implementing a system for detection and installation of software updates on a per-user basis.

Example Architecture

Figure 1:
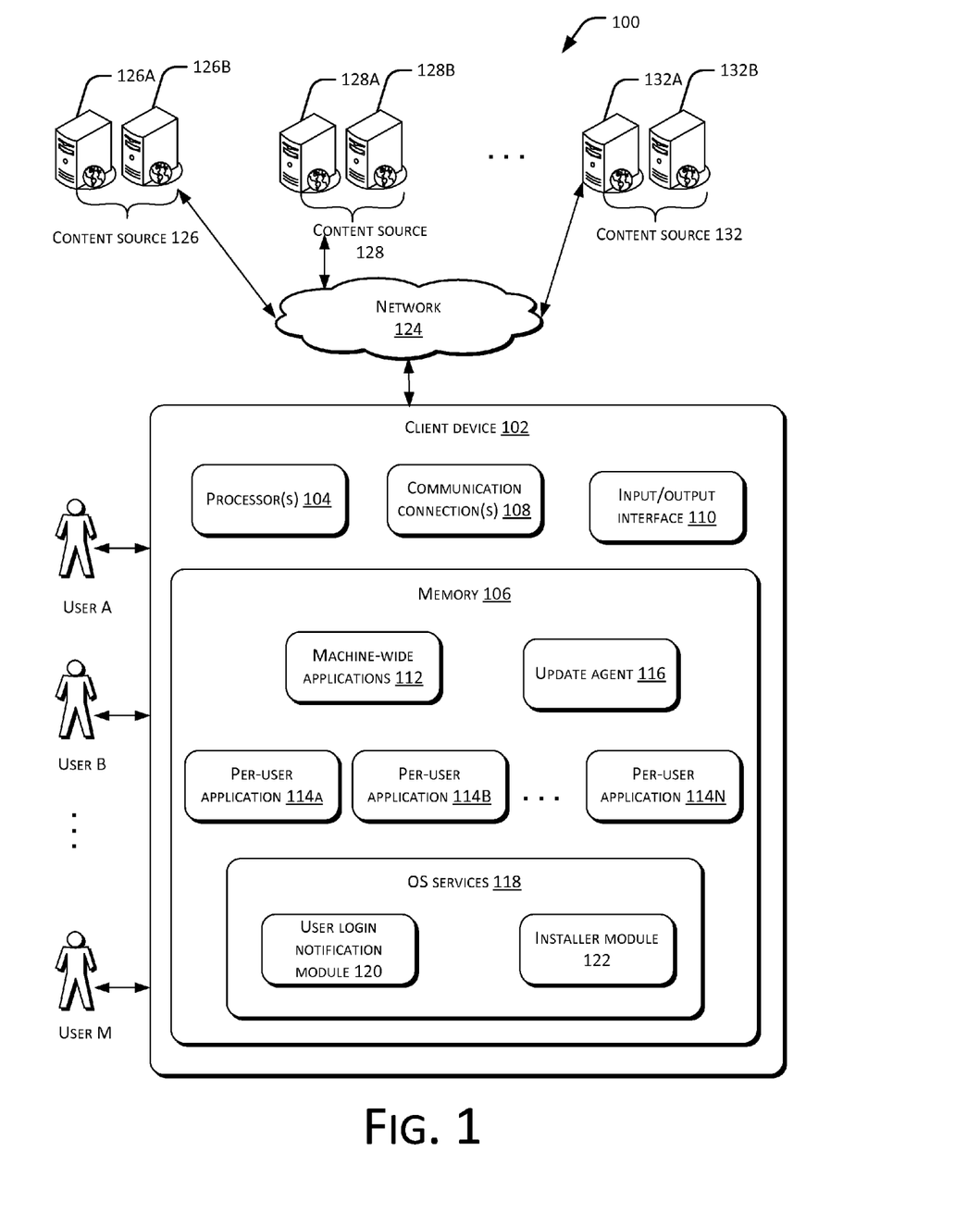
FIG. 1 is a pictorial diagram of an example environment usable to implement a system for detecting and installing software on a per-user basis.

FIG. 1 illustrates an example environment 100 usable to implement a system for detecting and installing software on a per-user basis. The environment 100 includes a client device 102. The client device 102 may be implemented as any of a variety of conventional computing devices including, for example, a desktop computer, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

The client device 102 includes one or more processors 104 coupled to memory 106. The client device 102 may further include one or more communication connection(s) 108 and one or more input/output interfaces 110. The communication connection(s) 108 allow the client device 102 to communicate with other computing devices over wired and/or wireless networks and may include, for example, wide area, local area, and/or personal area network connections. For example, the communication connection(s) 108 may include cellular network connection components, WiFi network connection components, Ethernet network connection components, or the like. Depending on the type of client device, the input/output interfaces 110 may include, for example, a touch screen or other display, a keyboard, a mouse, a touch pad, a roller ball, a scroll wheel, an image capture device, an audio input device, an audio output device, and/or any other input or output devices.

The memory 106 is an example of computer-readable media. Computer-readable media includes at least two types of computer-readable media, namely computer storage media and communications media. Computer storage media include volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The client device 102 may have a plurality of users A, ..., M, who can log into the client device 102 (e.g., have user accounts in the client device 102). Illustrated users A, ..., M represent any number of users. The memory 106 may include one or more machine-wide software applications 112. The machine-wide software applications 112 may be installed on the client device 102 such that the plurality of users A, ..., M of the client device 102, upon logging into the client device 102, may have an ability to view, use and/or run the machine-wide software applications 112. Thus, the machine-wide software applications 112 may be accessible to each of the plurality of users of the client device 102. As an example, the machine-wide software applications 112 may include an operating system (e.g., Windows® operating system, MacOS® operating system, or the like), one or more platform software applications (e.g., Java®), and/or various application programs (e.g., a web browser, an email client, a word processing application, a spreadsheet application, a voice recording application, a calendaring application, a text messaging client, a media player application, and/or the like).

In an embodiment, the memory 106 may also include per-user applications 114A, ..., 114N. Illustrated per-user applications 114A, ..., 114N represent any number of per-user applications. Each of the per-user applications 114A, ..., 114N may be installed, visible and/or accessible only to a corresponding subset of the plurality of users A, ..., M. Examples of the per-user applications 114A, ..., 114N may include various software application programs like a web browser, an email client, a news application, a text messaging client, a calendar application, a photo album application, an address book application, a weather application, a stock application, a viewfinder application, a social networking application, a game, and/or the like.

For example, user A may install a software application that provides real time stock prices from a stock exchange (henceforth, this software application will also be referred to as a stock application). User A may install the stock application such that user A (and not users B, ..., M) can access the stock application (e.g., run the stock application). Accordingly, the stock application may be an example of a per-user application (e.g., the per-user application 114A may be the stock application). Similarly, user B may install and access another application that provides real time weather information (henceforth, this software application will also be referred to as a weather application). Accordingly, the weather application may be another example of a per-user application (e.g., the per-user application 114B may be the weather application). In an example, user C (but not users A, D, ..., M) may also access the weather application, for example, based on user C also installing the weather application.

In an embodiment, the memory 106 may include an update agent 116 and operating system (OS) services 118. In an embodiment, the update agent 116 and the OS services 118 may be machine-wide applications. For example, the update agent 116 may be a part of the operating system of the client device 102. However, for purposes of clarity, the update agent 116 and the OS services 118 are illustrated to be separate from the machine-wide applications 112.

The update agent 116 may be configured to centrally manage updating the per-user applications 114A, ..., 114N of the client device 102. For example, the update agent 116 may centrally update the various per-user applications 114A, ..., 114N, with a relatively low level of involvement from various users A, ..., M of the client device 102, as will be discussed in more detail herein below.

The operating system (OS) services 118 may be one or more services provided by an operating system of the client device 104. The OS services 118 may include a user login notification module 120, which may be configured to provide a notification to the update agent 116 whenever a user logs into the client device 102. For example, if user A logs into the client device 102, the user login notification module 120 notifies the update agent 116 that user A has logged into the client device 102. The user login notification module 120 may also provide the update agent 116 a list of all users who have logged into the client device 102 in the past (for example, during a pre-defined time in the past, e.g., during the last six months).

The OS services 118 may also include an installer module 122. In an embodiment, the installer module 122, among other things, installs various software applications in the client device 102. For example, the installer module 122 installs the machine-wide applications 112, and/or per-user applications 114A, ..., 114N in the client device 102. In an embodiment, the installer module 122 may also install updates for various software applications (e.g., updates for machine-wide applications 112, and/or for per-user applications 114A, ..., 114N) in the client device 102, e.g., based on input received from the update agent 116, as will be discussed in more detail herein below.

In an embodiment and although not illustrated in FIG. 1, the client device 102 may include more than one installer module. For example, a first installer module may be configured to install and update a first per-user application, a second installer module may be configured to install and update a second per-user application and a third per-user application, and so on. For such an embodiment, the installer module 122 of FIG. 1 may represent all such installer modules.

In an embodiment and although not illustrated in FIG. 1, the installer module 122 may not be a part of the OS services 118. As an example, the client device 102 may include a plurality of installer modules, one or more of which may be a part of the OS services 118 and another one or more of which may not be a part of the OS services 118. The installer modules may be, for example, distributed as part of the operating system, and/or may be installed at a later time.

The example environment 100 may include a plurality of content sources 126, ..., 132. Illustrated content sources 126, ..., 132 may represent any number of content sources. Each of the plurality of content sources 126, ..., 132 may be configured to provide updates for one or more of the per-user applications 114A, ..., 114N.

For example, the content source 126 may provide updates for the per-user application 114A. In an embodiment, the content source 126 may be owned, rented, operated and/or otherwise be associated with an entity that provides the per-user application 114A. In another example, the content source 128 may provide updates for the per-user application 114B. In an embodiment, the content source 128 may be owned, rented, operated and/or otherwise be associated with an entity that provides the per-user application 114B.

A particular content source of the content sources 126 ..., 130 may provide updates for more than one software application (e.g., more than one per-user application). For example, the entity that provides the per-user application 114A may also provide the per-user application 114C. Accordingly, the content source 126 may provide updates for the per-user applications 114A and 114C.

In another example, providers of various per-user applications may associate themselves with a centralized entity, and the centralized entity may provide a content source that provides updates for the various per-user applications. In an embodiment and although not illustrated in FIG. 1, instead of the content sources 126, ..., 132, a single content source (e.g., a centralized content source) may provide updates for the per-user applications 114A, ..., 114N.

In an embodiment, each of the content sources 126 ..., 132 may be hosted on one or more servers. For example, the content source 126 is hosted on servers 126A and 126B, the content source 128 is hosted on servers 128A and 128B, the content source 132 is hosted on servers 132A and 132B, and so on. Although in FIG. 1 only two servers are illustrated as being associated with each of the content sources, any other number of servers (e.g., one, three, or more) may be associated with each of the content sources. As an example, individual content sources may be embodied in any number of ways, including as a single server, a cluster of servers, a server farm or data center, and so forth, although other server architectures (e.g., mainframe, a virtual server, and/or the like) may also be used. In an embodiment, multiple content sources (e.g., content sources 126 and 128) may, for example, be collectively hosted on a single server, a cluster of servers, a server farm or data center, and so forth, although other server architectures (e.g., mainframe, a virtual server, and/or the like) may also be used.

In an embodiment, in addition to providing updates for one or more software applications, a content source may also provide any other content, e.g., software applications (e.g., one or more per-user applications), non-application content (e.g., music, movies, or any other media, etc.), and/or the like.

The client device 102 may also receive updates for one or more of the machine-wide applications 112 from one or more other content sources, but such one or more other content sources are not illustrated in FIG. 1 for purposes of illustrative clarity and to not obfuscate the teachings of this disclosure. A particular content source of the content sources 126, ..., 132 may also provide updates for one or more of the machine wide applications 112, in addition to providing updates for one or more per-user applications.

The network 124 may be a wireless or a wired network, or a combination thereof. The network 128 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

Example Operations

The update agent 116 may be configured to centrally manage updating the per-user applications 114A, . . . , 114N of the client device 102. In an embodiment, the update agent 116 may periodically query the operating system of the client device 102 (e.g., query the installer module 122) and receive information about the per-user applications 114A, . . . , 114N. For example, the update agent 116 may receive an inventory of various per-user applications installed in the client device 102, a version number, preferences (e.g., whether updates are to be installed automatically or based on user permission), etc. for one or more of the per-user applications 114A, . . . , 114N, and/or the like.

The update agent 116 may transmit some or all of the information to the content sources 126, . . . , 132. For example, if the content source 126 provides updates for the per-user application 114A, then the update agent 116 may transmit to the content source 126 information associated with the per-user application 114A. For example, the update agent 116 may transmit to the content source 126 a version number of the per-user application 114A, preferences set in the per-user application 114A, an indication of updates of the per-user application 114A that have already been installed in the client device 102, and/or the like.

In response to receiving the information from the update agent 116, each of the content sources 126, . . . , 132 may transmit configuration data to the update agent 116. The update agent 116 may determine, from the configuration data received from a content source, whether updates are available from the content source for one or more per-user applications. For example, configuration data sent by the content source 126 (which may provide updates for the per-user applications 114A and 114C) may indicate availability of updates for the per-user applications 114A and 114C. The configuration data may also indicate unavailability of updates for one or more per-user applications from the content source, if no such updates are available.

In an embodiment, the configuration data from a content source may be tagged to indicate that the configuration data is associated with a per-user application. For example, upon receiving the configuration data from the content source 126, the update agent 116 may determine that the configuration data is associated with a software application that is a per-user application.

If updates are available from a content source for one or more per-user applications, the update agent 116 may transmit, to the installer module 122, information about the updates for the one or more per-user applications. In an embodiment, the installer module 122 may be aware of various per-user applications installed in the client device 102.

In an embodiment, upon receiving the configuration data for various per-user applications from various content sources, the installer module 122 may evaluate the configuration data from various content sources across all the users of the client device 102 (although in another embodiment, the update agent 116 may perform such evaluation). For example, the installer module 122 may determine whether the updates are applicable to one or more users of the client device 102. The installer module 122 may generate a list of the users of the client device 102, for whom updates for a per-user application is applicable (e.g., based on the associated configuration data, based on which users have the per-user application installed, based on which users have not yet updated the per-user application, and/or the like).

For example, upon receiving configuration data associated with updates for the per-user application 114B, the installer module 122 may determine that the per-user application 114B is installed by users B and C of the client device 102. The installer module 122 may also determine that the updates for the per-user application 114B are applicable to both users B and C. In another example (e.g., where the per-user application 114B is installed by users B and C), user B may already have updated the per-user application 114B (or may have installed an updated version of the per-user application 114B), while the user C may not have updated the per-user application 114B yet. In such a case, the installer module 122 may determine that the updates for the per-user application 114B are applicable to user C only.

In another example, upon receiving configuration data associated with updates for a news application (e.g., which provides real time news and which is a per-user application) from the content source 126, the installer module 122 may determine that the news application is not installed by any user of the client device 102. Alternatively, the installer module 122 may determine that although user A has installed the news application, the updates are not applicable as the installed news application was already updated by user A in the past. Accordingly, the installer module 122 may determine that the updates for the news application are not applicable to any of the users of the client device 102. In an embodiment, prior to contacting a contact source (e.g., contact source 126) to check for applicable updates to various per-user applications, the update agent 116 may communicate with the installer module 122 and obtain a list of all per-user applications supported by the installer module 122 that are currently installed on client device 102. When the update agent 116 contacts, for example, the content source 126 to obtain configuration data for various per-user applications, the update agent 116 may provide the content source 126 with the list of all per-user applications. The content source 126 may then return configuration data associated with only those per-user applications, which are in the list. This may allow the client device 102 to receive configuration data for only those per-user applications that may be applicable to one or more users of the client device 102. In such an embodiment, if the news application is not installed by any user of the client device 102, the news application may not be included in the list, and the content source 126 may not provide configuration data associated with the news application to the client device 102.

Figure 2A:
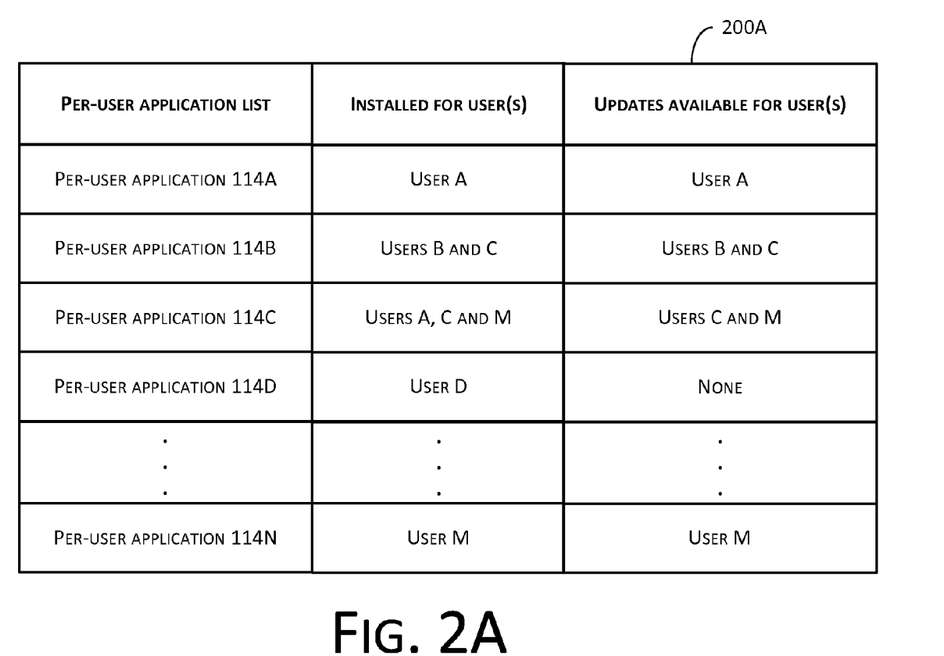
FIG. 2A illustrates an example table that maps one or more per-user applications to (i) one or more users for whom a corresponding per-user application is installed, and (ii) one or more users for whom updates for the corresponding per-user application are available.

The update agent 116 may generate a mapping between the users and updates for one or more of the per-user applications 114A, . . . , 114N that are applicable to one or more of the users. The update agent 116 may store the mapping in an appropriate location in the memory 106. FIG. 2A illustrates an example table 200A that maps one or more of the per-user applications 114A, . . . , 114N to (i) one or more users for whom a corresponding per-user application is installed, and (ii) one or more users for whom updates for the corresponding per-user application are available. The table 200A may be generated by the update agent 116, based on configuration data received from various content sources and information received from the installer module 122. The update agent 116 may store the table 200A in an appropriate location in the memory 106.

Referring to the table 200A, as an example, the per-user application 114A may be installed for user A, and updates for the per-user application 114A may be available and applicable to user A. The per-user application 114B may be installed for users B and C, and updates for the per-user application 114B may be available and applicable to users B and C. The per-user application 114C may be installed for users A, C and M, and updates for the per-user application 114C may be available and applicable to users C and M (e.g., updates for the per-user application 114C may not be applicable to user A, as user A, for example, may have previously updated the per-user application 114C). The per-user application 114D may be installed for user D, and may not have any updates available.

In an embodiment, various variations of the table 200A may be possible. For example, the table 200A may indicate only those users for whom updates are currently available. In such a case, the second column of the table 200A may be redundant, and may be omitted from the table 200A.

Figure 2B:
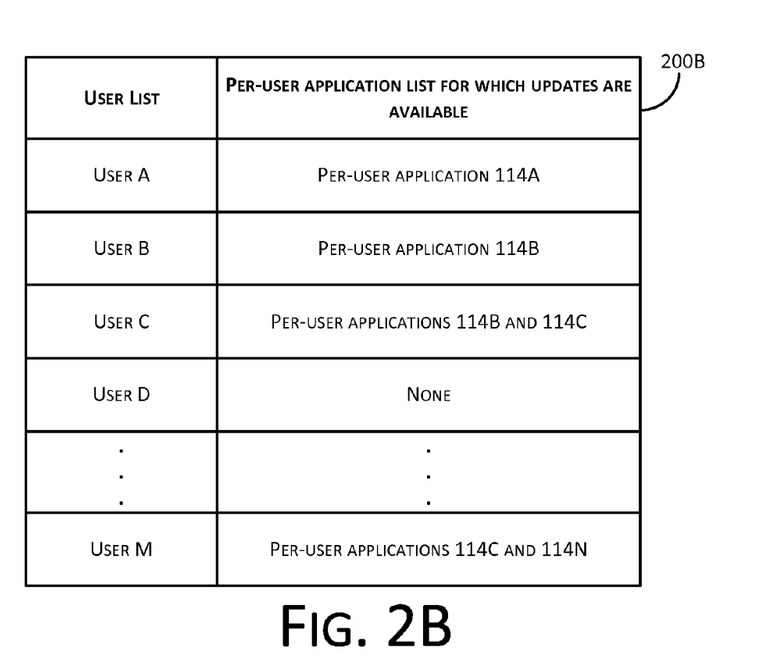
FIG. 2B is an example table that maps each of one or more users of a client device to updates for one or more per-user applications that are applicable to the corresponding user.

FIG. 2B illustrates another example table 200B that maps each of one or more users of the client device 102 with updates for one or more of the per-user applications 114A, ..., 114N that are applicable to the corresponding user. The table 200B may be generated by the update agent 116, based on configuration data received from various content sources and information received from the installer module 122. Additionally or alternatively, the table 200B may also be generated by the update agent 116 based on the table 200A. The update agent 116 may store the table 200B in an appropriate location in the memory 106. Referring to the table 200A, user A may have access to per-user application 114A for which updates are applicable, user B may have access to per-user application 114B for which updates are applicable, and so on.

One of the tables 200A and 200B may be constructed based at least in part on information available from another of the tables 200A and 200B. In an embodiment, the update agent 116 may generate and store only one of the tables 200A and 200B, or both the tables 200A and 200B.

In an embodiment, while detecting that updates for a per-user application are applicable to a user, the user need not be logged into the client device 102. For example, while user A is logged into the client device 102, the update agent 116 may determine that updates to per-user application 114B are available and applicable to users B and C (e.g., based on communicating with the content sources 126, ..., 132 and the installer module 122). That is, the update agent 116 may identify updates for users B and C without users B and C being logged into the client device 102.

The update agent 116 may also download updates for one or more of the per-user applications 114A, ..., 114N, which may be applicable to one or more of the users A, ..., M of the client device 102. The update agent 116 may download the updates according to, for example, a schedule and a frequency set by the update agent 116 (or set by an administrator of the client device 102). Additionally or alternatively, the update agent 116 may download the updates at any opportunistic time (e.g., when free bandwidth is available, when a processing load of the client device 102 is low, etc.). In an embodiment, updates for a per-user application applicable to a user are downloaded even if a different user is logged into the client device 102. For example, updates for per-user application 114B may be applicable to users B and C. Such updates may be downloaded while, for example, user A is logged into the client device 102. In an alternate embodiment, updates for a per-user application applicable to a particular user are downloaded only when the particular user is logged into the client device 102. In an embodiment, if an update for a per-user application is applicable to more than one user, the update may be downloaded only once. For example, updates for per-user application 114B may be applicable to users B and C. The updates for per-user application 114B may be downloaded only once, and the downloaded updates may be used for both users B and C for installation.

In an embodiment, updates for a per-user application applicable to a particular user may be installed only when the particular user is logged into the client device 102. For example, as illustrated in tables 200A and 200B, updates for per-user application 114A may be applicable to user A. Accordingly, updates for per-user application 114A may be installed when user A is logged into the client device 102.

In an embodiment, when a user logs into the client device 102, the update agent 116 may receive a notification from the user login notification module 120, where the notification may indicate that the user has logged in. When the user logs into the client device 102, the update agent 116 may check to determine if updates, which are applicable to the user, are available for installation. If such updates are available for installation, in an embodiment, the update agent 116 may install the updates automatically (e.g., without any input from the user for installing the updates). In another embodiment, the update agent 116 may notify the user and ask for user permission before installing the updates.

A decision as to whether to automatically install the updates or whether to seek user permission to install the updates may be based on, for example, preferences set by the user, configuration of the update agent 116, criticality of the updates (e.g., critical updates may be installed automatically, and non-critical updates may be installed based on user permission), and/or preferences set in the associated configuration data. For example, configuration data received from the content source 126, which provides updates for per-user application 114A (e.g., that are applicable to user A), may specify automatic installation of updates. Accordingly, when user A logs into the client device 102, the update agent 116 may install the updates.

In an alternate embodiment, updates for a per-user application applicable to a particular user may be installed even when the particular user is not logged into the client device 102. For example, the update agent 116 may store user credentials (e.g., log-in ID, password, etc.) for the particular user. While a different user is logged in, the update agent 116 may use the stored user credential to emulate logging in of the particular user in the client device 102 and install the updates for the per-user application applicable to the particular user.

Example Methods

Figure 3:
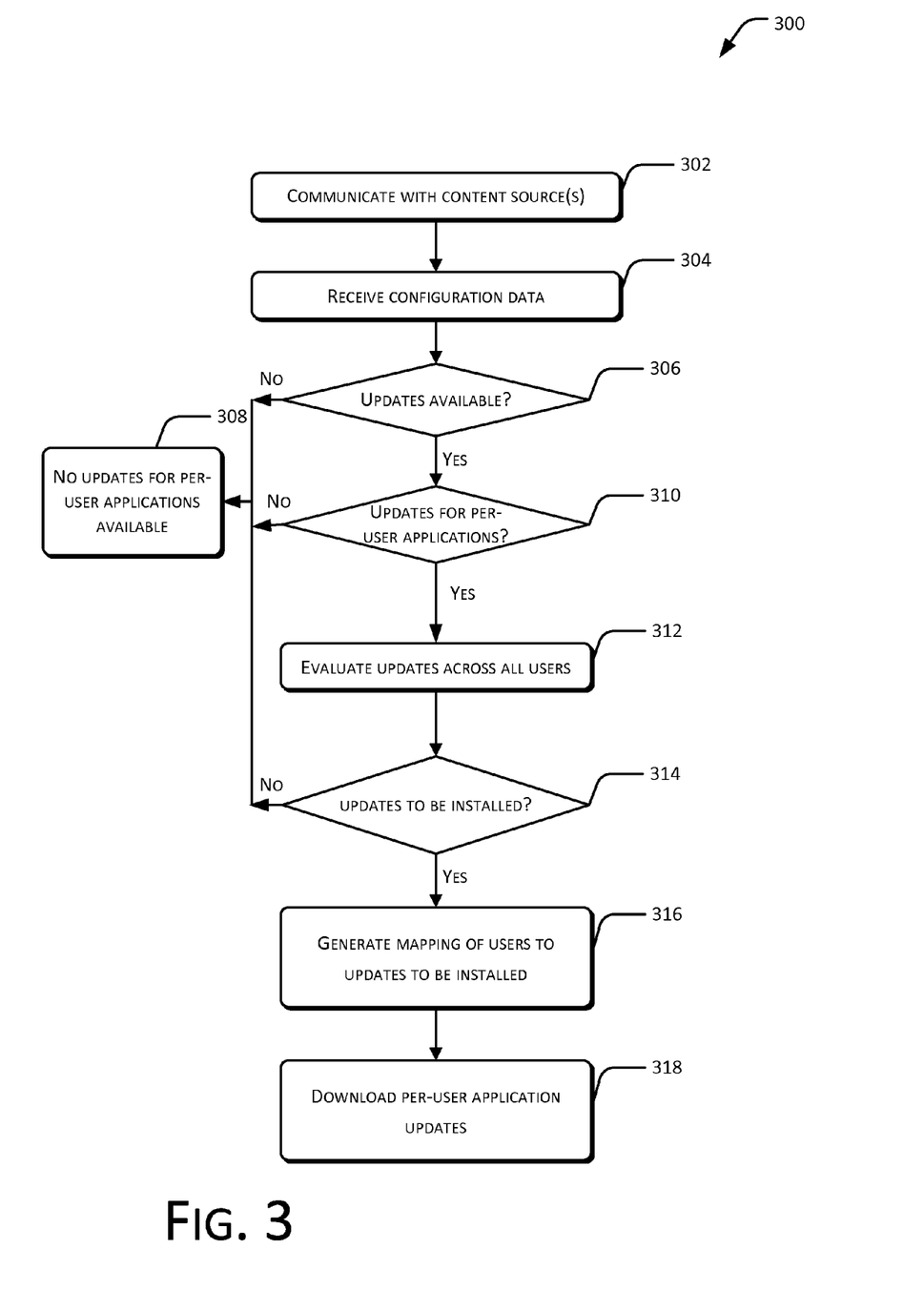
FIG. 3 is a flow chart depicting an example method of detecting and downloading updates for one or more per-user applications in the environment of FIG. 1.
Figure 4:
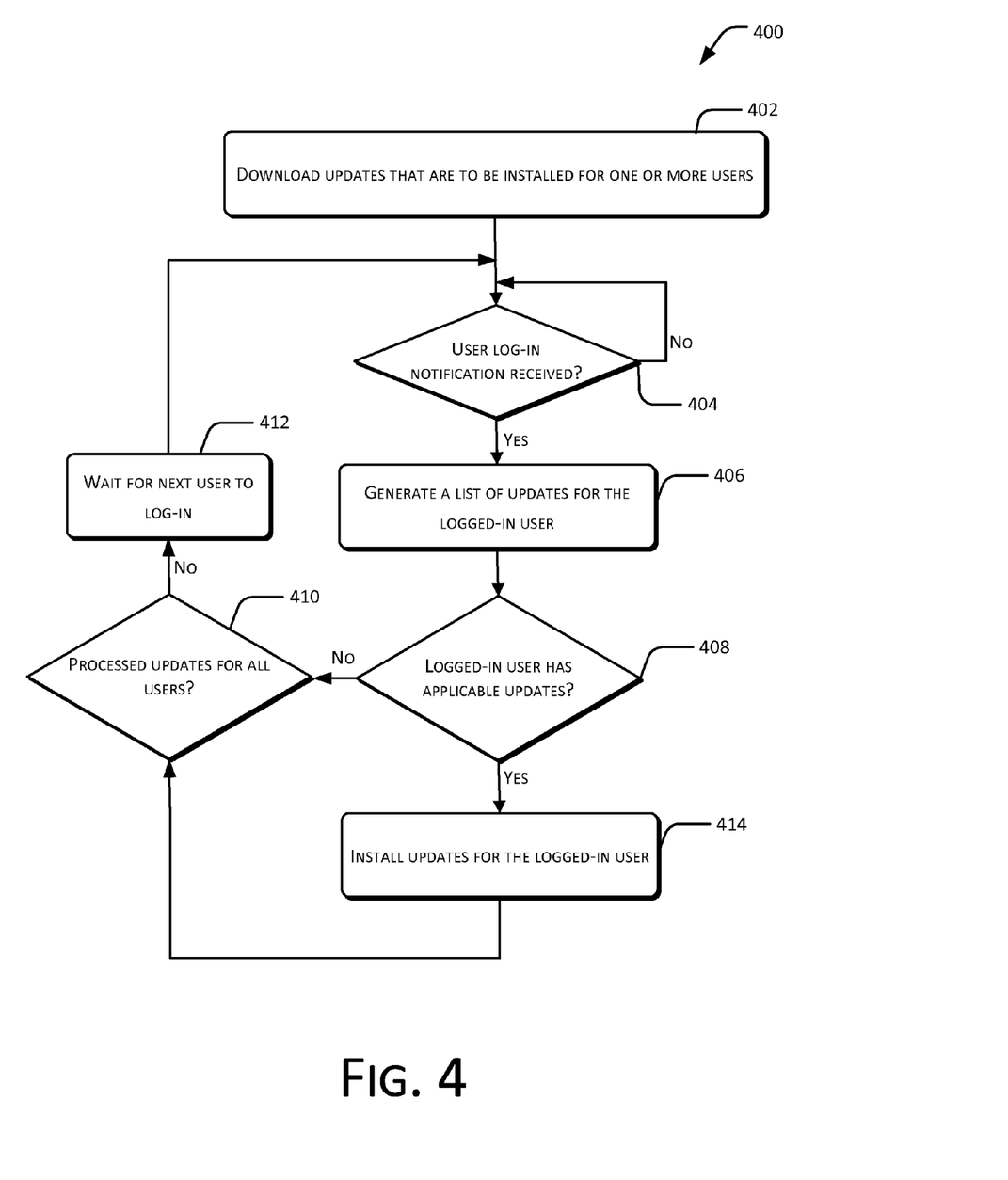
FIG. 4 is a flow chart depicting an example method of installing updates for one or more per-user applications in the environment of FIG. 1.
Figure 5:
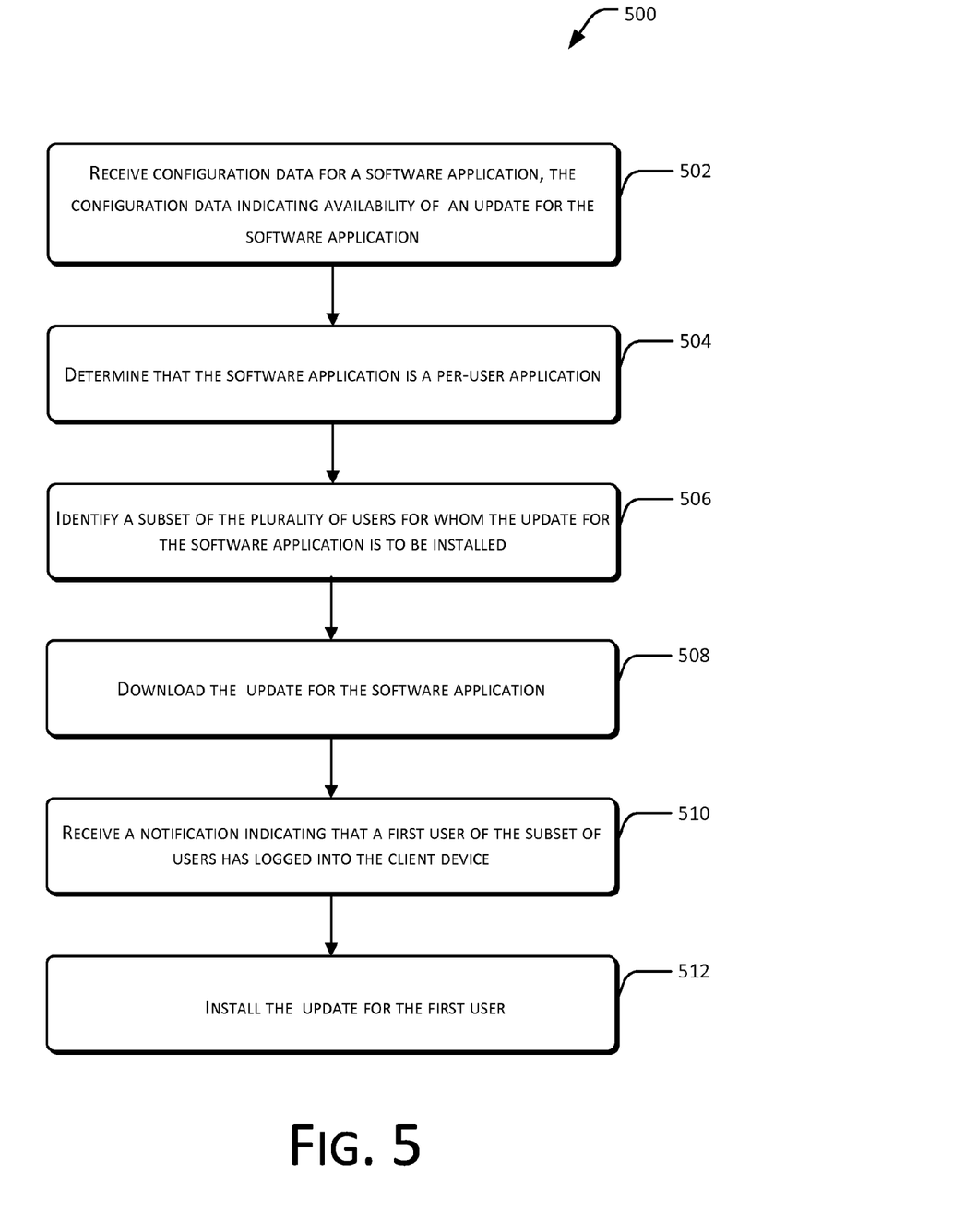
FIG. 5 is a flow chart depicting an example method of detecting, downloading and installing updates for a per-user application in the environment of FIG. 1.

FIG. 3 is a flow chart depicting an example method 300 of detecting and downloading updates for one or more per-user applications 114A, ..., 114N in the environment 100 of FIG. 1. FIG. 4 is a flow chart depicting an example method 400 of installing updates for one or more per-user applications 114A, ..., 114N in the environment 100 of FIG. 1. FIG. 5 is a flow chart depicting an example method 500 of detecting, downloading and installing updates for a per-user application in the environment 100 of FIG. 1.

The methods of FIGS. 3-5 may, but need not, be implemented in the environment of FIG. 1. For ease of explanation, methods 300, 400 and 500 are described with reference to FIG. 1. However, the methods 300, 400 and 500 may alternatively be implemented in other environments and/or using other systems.

Methods 300, 400 and 500 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are each illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be omitted from the methods without departing from the spirit and scope of the subject matter described herein. In the context of software, the blocks represent computer instructions that, when executed by one or more processors, perform the recited operations.

Referring again to FIG. 3, at block 302, the update agent 116 may communicate with one or more of the content sources 126, . . . , 132 (e.g., to check for updates for the per-user applications 114A, . . . , 114N). For example, the update agent 116 may transmit information about various per-user applications 114A, . . . , 114N to the one or more of the content sources 126, . . . , 132, as previously discussed.

At block 304, the update agent 116 may receive configuration data from one or more of the content sources 126, . . . , 132. The configuration data associated with a per-user application may indicate, for example, availability (or unavailability) of updates for the per-user application. In an embodiment, the configuration data from a content source may be tagged to indicate that the configuration data is associated with a software application that is a per-user application.

At block 306, the update agent 116 may determine, from the configuration data received from one or more content sources, if updates are available for associated per-user applications. If the configuration data indicates unavailability of updates for any of the associated per-user applications, then the update agent 116, at block 308, may determine that no new updates for per-user applications are currently available. Subsequent to block 308, the method 300 may terminate, and the update agent 116 may communicate with one or more of the content sources 126, . . . , 132 at a later time (e.g., loop back to block 302 at a later time).

On the other hand, if the configuration data indicates availability of new updates at block 306, then at block 310 the update agent 116 may determine whether the updates are specifically for per-user applications. As previously discussed, configuration data from a content source may be tagged to indicate that the configuration data is associated with a per-user application (as opposed to being associated with a machine-wide application). The determination at block 310 may be based on the evaluating the tagging of the configuration data.

If, at block 310, it is determined that none of the updates are for per-user applications, then the method 300 may proceed to block 308. If, at block 310, it is determined that one or more updates are for per-user applications, then the method 300 may proceed to block 312.

At block 312, the installer module 122 may evaluate the available updates for various per-user applications across all users of the client device 102. For example, the installer module 122 may determine whether the available updates are applicable to one or more users of the client device 102. Based on the evaluation at block 312, the update agent 116 (and/or the installer module 122) may determine if the updates for various per-user applications are to be installed for one or more users. For example, if the installer module 122 determines that the per-user application 114A is installed by user A and updates for the per-user application 114A are available, then at 314, it is determined that the updates for the per-user application 114A are to be installed in the client device 102. If updates are to be installed in the client device 102, the method proceeds to block 316. In another example, upon receiving configuration data indicating updates for a news application (e.g., which is a per-user application), the installer module 122 may determine that the news application is not installed by any user of the client device 102. Accordingly, the installer module 122 may determine, at block 314, that the updates for the news application are not to be installed in the client device 102. If no updates are available for installation in the client device 102, the method may proceed to block 308.

At block 316, the update agent 116 may generate a mapping between each of the users A, . . . , M with updates for one or more of the per-user applications 114A, . . . , 114N that are applicable to the corresponding user. The mapping may be in accordance with, for example, table 200A of FIG. 2A and/or table 200B of FIG. 2B. The update agent 116 may store the mapping in an appropriate location in the memory 106.

At block 318, the update agent 116 may download the applicable updates for the per-user applications, e.g., based on the mapping generated at block 316. The update agent 116 may download the updates according to, for example, a schedule and a frequency set by the update agent 116 or a user of the client device 102. Additionally or alternatively, the update agent 116 may download the updates at an opportunistic time. Subsequent to block 308, the update agent 116 may proceed to install the downloaded updates, as discussed with respect to FIG. 4. Additionally or alternatively, the example method 300 may restart from block 302 at a later time (i.e., the update agent 116 may communicate with one or more of the content sources 126, . . . , 132 at a later time).

FIG. 4 depicts an example method 400 of installing updates for one or more per-user applications 114A, . . . , 114N. At block 402, the update agent 116 may download updates that are to be installed for one or more of the users A, . . . , M for one or more per-user applications 114A, . . . , 114N. As an example, operations at block 402 may be in part similar to the method 300 of FIG. 3, e.g., downloading of updates at block 318 of FIG. 3.

At block 404, the update agent 116 may receive, from the user login notification module 120, a notification that a user (e.g., user A) has logged into the client device 02. At block 406, the update agent 116 may generate a list of updates for the user who is logged into the client device 102 (e.g., generate a list that indicates that updates for per-user application 114A may be installed for user A). In an embodiment, the update agent 116 may generate such a list from table 200A and/or table 200B.

At block 408, the update agent 116 may determine, from the generated list, if the logged-in user has applicable updates. For example, for user A, a determination may be made that updates are applicable to user A (e.g., updates for per-user application 114A are applicable to user A). If no updates are applicable to the logged-in user, the method 400 may proceed to block 410, where the update agent 116 may determine if updates have been processed for all of the users A, ..., M. If, at block 410, it is determined that updates have been processed for all of the users A, ..., M, the update agent 116 may wait for downloading of new updates (i.e., the method 400 may loop back to block 402). If, at block 410, it is determined that updates have not been processed for all of the users A, ..., M, the method 400 may proceed to block 412, and the update agent 116 may wait for the remaining users to log into the client device 102 (i.e., loop back to block 404). If, at block 410, it is determined that updates have been processed for all of the users A, ..., M, the example method 400 may restart from block 402 at a later time (i.e., the update agent 116 may download new updates at a later time, e.g., as and when new updates become available).

If, at block 408, it is determined that updates are available for installation for the logged-in user, then the installer module 122 may install the applicable updates for the logged-in user at block 414. In an embodiment, the installer module 122 may install the updates automatically (e.g., without any input from the user), upon the user logging into the client device 102. In another embodiment, the installer module 122 may notify the user and ask for user permission before installing the updates. Subsequent to block 414, the method may loop back to block 410, as illustrated in FIG. 4.

FIG. 5 depicts an example method 500 of detecting, downloading and installing per-user application updates. At block 502, the update agent 116 may receive configuration data for a software application (e.g., per-user application 114B) from a content source. The configuration data may indicate availability of an update for the software application.

At block 504, the update agent 116 may determine that the software application is a per-user application (e.g., based on tags included in the configuration data). At block 506, the update agent 116 may identify (e.g., based on communication with the installer module 122) a subset of the plurality of users A, ..., M for whom the update for the software application is to be installed. For example, as illustrated in table 200A, the update agent 116 may identify users B and C for whom the update for the per-user application 114B is to be installed.

At block 508, the update agent 116 may download the update for the software application. At block 510, the update agent 116 may receive a notification (e.g., from the user login notification module 120) indicating that a first user (e.g., user B) of the subset of users has logged into the client device 102. At block 512, the installer module 122 may install the update that is applicable to the first user, in response to receiving the notification.

In an embodiment, operations at blocks 502, ..., 508 may be performed regardless of whether the first user (i.e., user B) is logged into the client device 102. In an embodiment, operations at block 512 may be performed when the first user is logged into the client device 102. In another embodiment, the update agent 116 stores credentials of the first user, and uses the stored credentials to install the updates for the first user while the first user is not logged into the client device 102.

By way of example and not limitation, any of the operations of any of the methods described herein may be implemented under control of one or more processors configured with executable instructions that may be stored on one or more computer-readable media such as one or more computer storage media.

CONCLUSION

Although the invention has been described in language specific to structural features and/or methodological operations, it is to be understood that the invention is not necessarily limited to the specific features or operations described. Rather, the specific features and operations are disclosed as exemplary forms of implementing the invention.

What is claimed is:

1. A method comprising: receiving, from a server, by a client device, configuration data for a software application, the configuration data indicating availability of an update for the software application, the client device having user accounts for a plurality of users, the configuration data including a tag that indicates whether the software is a per-user application, wherein the per-user application is a type of software application that is only accessible to a subset of the plurality of users; determining that the software application is a per-user application based on the tag included in the configuration data for the software application received from the server; and based on determining that the software application is a per-user application, identifying a subset of the plurality of users for whom the update for the software application is to be installed.

2. A method as recited in claim 1, wherein the subset of the plurality of users comprises a first user, the method further comprising: performing, regardless of whether the first user is logged into the client device, said receiving the configuration data, said determining that the software application is a per-user application, and said identifying the subset of the plurality of users.

3. A method as recited in claim 1, wherein the subset of the plurality of users includes a first user, the method further comprising: downloading the update for the software application; receiving a notification indicating that the first user has logged into the client device; and installing the update for the first user, in response to receiving the notification.

4. A method as recited in claim 3, further comprising: receiving configuration data for another software application that is another per-user application, the configuration data for the another software application indicating availability of another update for the another software application; identifying that the another update is to be installed for the first user; and installing the another update for the first user, in response to receiving the notification.

5. A method as recited in claim 3, wherein the subset of the plurality of users further includes a second user, the method further comprising: receiving a notification indicating that the second user has logged into the client device; and installing the update for the second user, in response to receiving the notification indicating that the second user has logged into the client device.

6. A method as recited in claim 1, wherein the subset of the plurality of users includes a first user, the method further comprising: downloading the update for the software application, wherein the update for the software application is downloaded while the first user is not logged into the client device.

7. A method as recited in claim 1, wherein the subset of the plurality of users includes a first user, the method further comprising: downloading the update for the software application; storing credentials of the first user; and while the first user is not logged into the client device, using the credentials of the first user to emulate logging in of the first user and to install the update for the first user.

8. A method as recited in claim 1, wherein the software application is a first software application, the method further comprising: receiving configuration data for a plurality of software applications that includes the first software application, the configuration data for the plurality of software applications indicating availability of updates for two or more of the plurality of software applications; determining that the two or more software applications are per-user applications; and based on determining that the two or more software applications are per-user applications, identifying, for each of the two or more software applications, a corresponding one or more of the plurality of users for whom the update for the corresponding software application is to be installed.

9. A method as recited in claim 8, further comprising: generating a mapping between (i) each of the two or more software applications, and (ii) the one or more of the plurality of users for whom the update for the corresponding software application is to be installed; and download the updates for the two or more software applications based on the generated mapping.

10. One or more computer-readable storage devices configured with computer-executable instructions that, when executed by one or more processors, configure the one or more processors to perform acts comprising: obtaining, by a client device, an inventory of per-user applications installed on the client device; receiving, from a server, by the client device, configuration data associated with a plurality of the per-user applications based on the inventory of per-user applications installed on the client device, the configuration data indicating availability of updates for the plurality of per-user applications, the client device having user accounts for a plurality of users, the configuration data including a tag indicating that at least one of the plurality of per-user applications is a per-user application; determining that the at least one of the plurality of per-user applications is a per-user application based on the tag included in the configuration data received from the server for the at least one of the plurality of per-user applications; identifying updates for one or more of the plurality of per-user applications, which are applicable to a user of the plurality of users; downloading the updates for the one or more of the plurality of per-user applications; and installing the updates for the one or more of the plurality of per-user applications, wherein the receiving, the identifying and the downloading are performed regardless of whether the user is logged into the client device, and wherein the installing is performed while the user is logged into the client device.

11. One or more computer-readable storage devices as recited in claim 10, wherein said installing further comprises: receiving a notification indicating that the user has logged into the client device; and installing the updates in response to receiving the notification.

12. One or more computer-readable storage devices as recited in claim 10, the acts further comprising: identifying updates for another one or more of the plurality of per-user applications, which are applicable to another user of the plurality of users; and downloading the updates for the another one or more of the plurality of per-user applications.

13. One or more computer-readable storage devices as recited in claim 12, the acts further comprising: installing, while the another user is logged into the client device, the updates for the another one or more of the plurality of per-user applications.

14. One or more computer-readable storage devices as recited in claim 12, the acts further comprising: storing credentials of the another user; and using the credentials of the another user, installing the updates for the another one or more of the plurality of per-user applications, while the another user is not logged into the client device.

15. A system comprising: one or more processors; memory, communicatively coupled to the one or more processors; and an update agent stored in the memory and executable by the one or more processors to: receive an inventory of per-user applications installed on a client device; receive from a server, configuration data for a plurality of software applications based on the inventory of per-user applications installed on the client device, the configuration data for the plurality of software applications indicating that each of the plurality of software applications has a corresponding update available, the configuration data including one or more tags indicating that one or more of the plurality of per-user applications is a per-user application, wherein the system is configured to allow a plurality of users to log into the system; determine that the plurality of software applications are per-user applications based on the one or more tags included in the configuration data received from the server for the plurality of software applications; and based on determining that the plurality of software applications are per-user applications, identify, for each of the plurality of software applications, a corresponding one or more of the plurality of users for whom the corresponding update is to be installed.

16. The system of claim 15, wherein the update agent is further executable by the one or more processors to: for each of the plurality of software applications, download the corresponding update.

17. The system of claim 16, wherein: the plurality of software applications includes a first software application; the plurality of users includes a first user for whom the update for the first software application is to be installed; and the update for the first software application is downloaded regardless of whether the first user is logged into the system.

18. The system of claim 15, wherein the update agent is further executable by the one or more processors to: generate a mapping between (i) each of the plurality of users and (ii) updates for one or more of the plurality of software applications that are applicable to the corresponding user.

19. The system of claim 15, further comprising: an installer module stored in the memory and executable by the one or more processors; a user login notification module stored in the memory and executable by the one or more processors to: determine that a user of the plurality of users has logged into the system; and generate a notification indicating that the user has logged into the system; wherein the update agent is further executable by the one or more processors to: receive the notification; and based on receiving the notification, identify updates for one or more of the plurality of software applications that are applicable to the user; and wherein the installer module is executable by the one or more processors to install, while the user is logged into the system, the updates for the one or more of the plurality of software applications that are applicable to the user.

20. The system of claim 15, further comprising: an installer module stored in the memory and executable by the one or more processors; wherein the update agent is further executable by the one or more processors to: identify updates for one or more of the plurality of software applications, which are applicable to a user of the plurality of users; store credentials of the user; and using the stored credentials, emulate a log-in event of the user; and wherein the installer module is executable by the one or more processors to install the updates for the one or more of the plurality of software applications while the update agent emulates the log-in event of the user.

* * * * *